United States Patent [19]
Knurr et al.

[11] Patent Number: 5,695,023
[45] Date of Patent: Dec. 9, 1997

[54] VEHICLE PEDAL ASSEMBLY

[75] Inventors: Randal S. Knurr, Waterford; Lynn G. Westbrook, Racine, both of Wis.

[73] Assignee: Textron Inc., Providence, R.I.

[21] Appl. No.: 578,180

[22] Filed: Dec. 29, 1995

[51] Int. Cl.$^6$ ............................................. B60K 20/00
[52] U.S. Cl. ............................. 180/336; 74/747; 74/512
[58] Field of Search .............................. 180/333, 336, 180/305, 306, 307; 74/474, 478, 478.5, 512

[56] References Cited

U.S. PATENT DOCUMENTS

| | | | |
|---|---|---|---|
| 3,853,020 | 12/1974 | Clark | 74/474 |
| 3,960,233 | 6/1976 | Aldred | 74/474 |
| 4,156,370 | 5/1979 | Callaghan | 74/474 |
| 4,600,075 | 7/1986 | Heidner et al. | 180/336 |
| 4,608,879 | 9/1986 | Ishida et al. | 74/512 |
| 5,511,631 | 4/1996 | Tsuchihashi et al. | 74/478 |

*Primary Examiner*—Paul N. Dickson
*Attorney, Agent, or Firm*—Arthur J. Hansmann

[57] ABSTRACT

A vehicle pedal assembly which includes a pedal extending in spaced position over a foot platform and with the pedal being movable up and down for respective control of the vehicle and/or of implements mounted on the vehicle. The operator can press down or lift up on the pedal, while resting his heel on the platform, and he can actuate the pedal in either the up or down direction for vehicle traction control, with one pedal, and for control of the implements mounted on the vehicle, with another pedal.

13 Claims, 5 Drawing Sheets

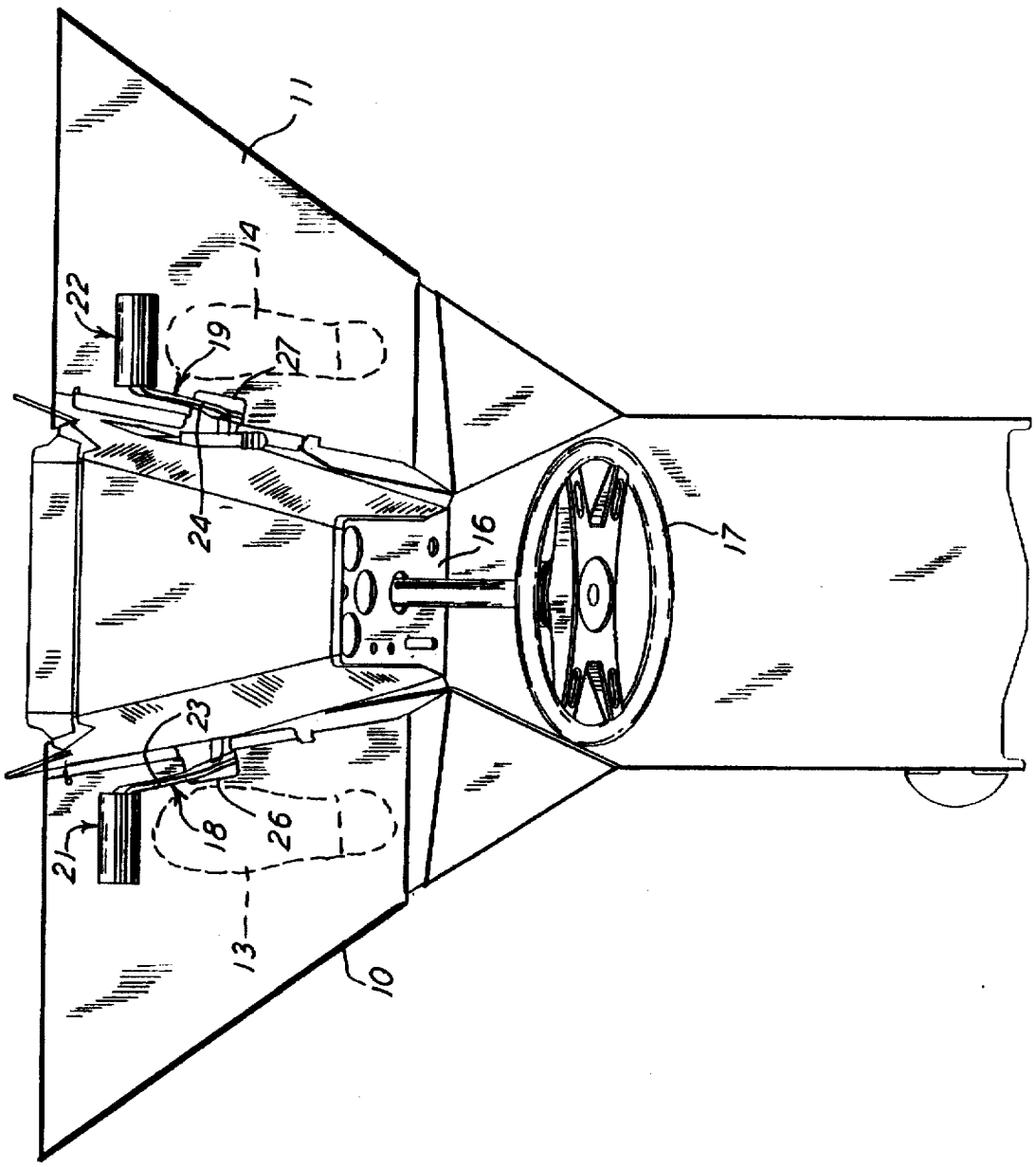

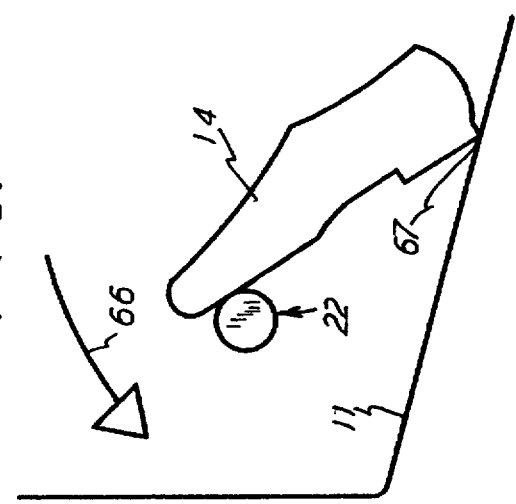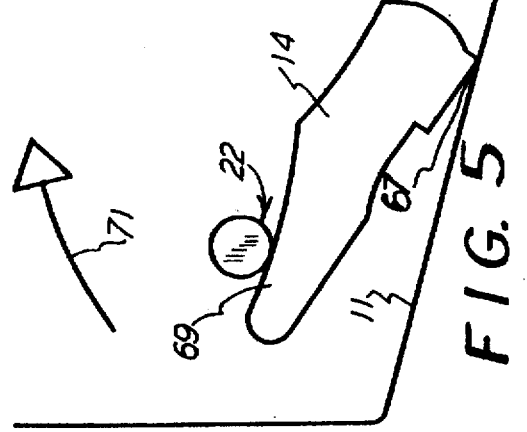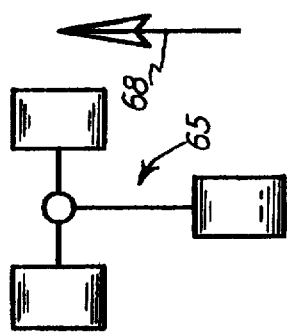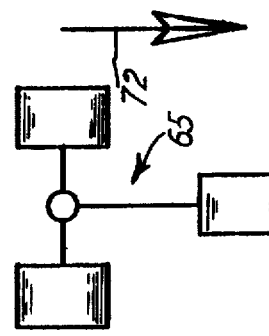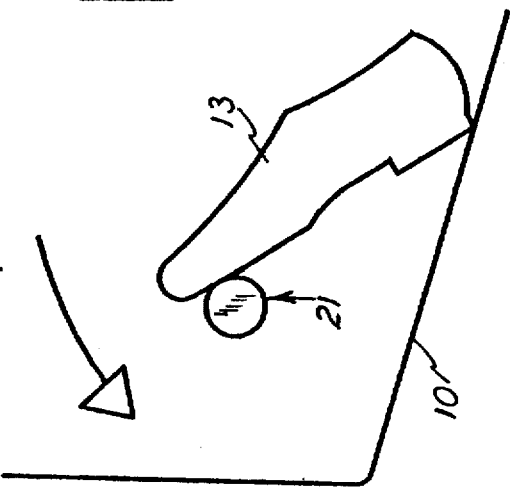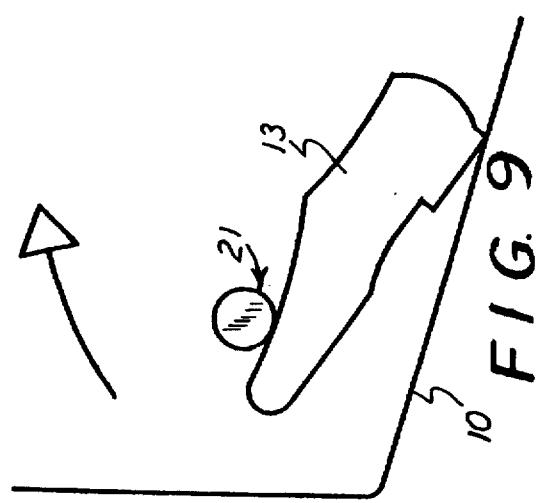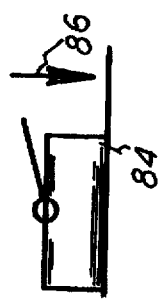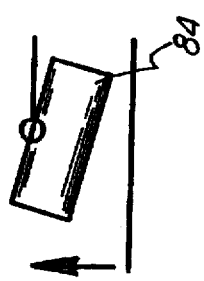

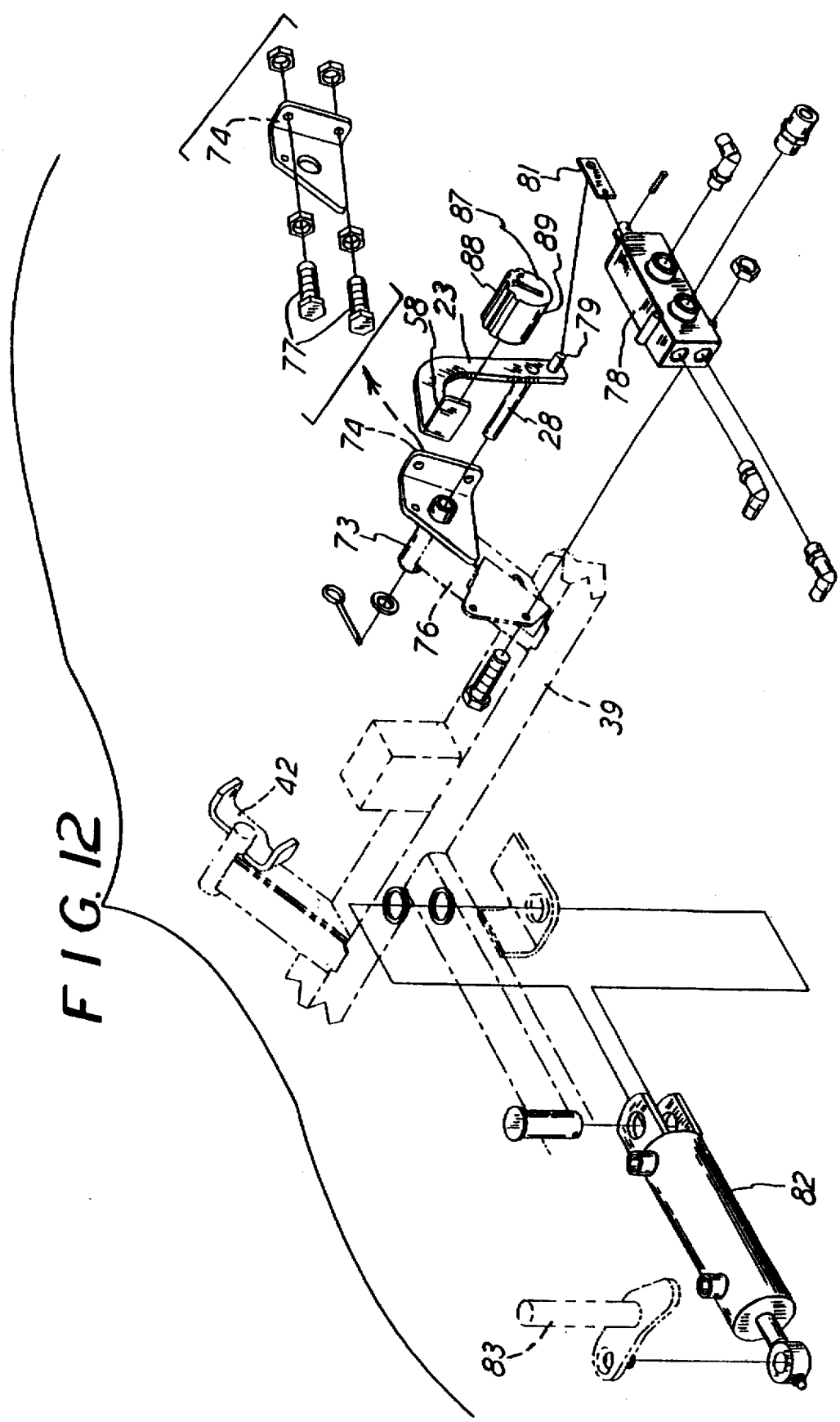

VEHICLE PEDAL ASSEMBLY

This invention relates to a vehicle control pedal system, and more particularly, it relates to a left and right foot pedal system on an implement vehicle such as a riding lawn mower.

BACKGROUND OF THE INVENTION

The prior art is already aware of utilitarian vehicles which have foot pedal assemblies and controls and particularly wherein the operator can press downwardly on the pedal for the control of the direction of the vehicle. One such arrangement is shown in U.S. Pat. No. 4,543,850.

Further, other examples of prior art foot pedal controls are seen in U.S. Pat. Nos. 4,352,302 and 5,216,935 and 5,228,360 and 5,231,891. All of these examples pertain to a two-pad or two-pedal type of control where the operator moves his foot between the two pads to achieve the particular control function desired. As such, these distinguish from the present invention.

Finally, the prior art is also aware of foot pedal controls which have horizontally extending portions which extend adjacent the operator's foot. In U.S. Pat. No. 4,061,051, the two extending pedal portions are pressed downwardly by either the operator's toe or heel in order to control the function. Also, in U.S. Pat. No. 3,919,896, the horizontally extending pedal portion is receptive to the operator's toe for either depressing downwardly on one portion and for lifting upwardly on another portion of the pedal. However, there is no arrangement where only one extending portion is available for both the down and up actions as desired in these control assemblies.

Still another prior art arrangement is seen in U.S. Pat. No. 3,722,314, where again there are two separate pedals for downward or pressing action only, and the two pedals produce different functions for the control of a vehicle transmission.

In contrast, the present invention provides for a pedal control which serves two functions, such as both the forward and reverse traction drive of a vehicle, and another pedal for the operator's other foot is available for serving the two functions of lowering and raising implements on the vehicle, such as lawn mowers. That is, both right and left feet pedals are provided on the vehicle so that the operator can utilize both feet for performing four distinct functions through the manipulation of the two pedals. In both instances, the operator can also rest his feet on a platform spaced below each of the pedals, and he can then raise his foot underneath one pedal to force upwardly thereon and perform one function, and he can position his foot above that pedal and depress it to perform yet a different function. Further, not only is the full footrest type platform provided spaced below the two pedals, but the operator can also support his foot from his heel while he is both lifting and lowering the respective pedal.

Still further, in a hydrostatic type of power unit, such as involved in this invention, the operator must maneuver his foot from the positions above and below the respective pedal, and in doing so, a moment of time is consumed so that the hydrostatic unit can equalize itself before the pedal is positioned for opposing type of function from that just previously imposed upon the system. That is, there are no dangers of a hydrostatic surge of pressure in an undesired direction, and this is because of the moment of time taken before the operator's foot is positioned for reversing the pressure on the pedal and thereby reversing the function performed by that pedal.

In this invention, the pedals are cylindrical on a horizontal axis, and there is a tread on the upper semi-circular half, and the lower semi-circular half is smooth. Thus, there is no shoe slipping nor scuffing, and it is comfortable for the user's foot.

BRIEF DESCRIPTION OF THE DRAWINGS

FIG. 2 is a top plan view of the vehicle of FIG. 1.

FIG. 3 is a diagrammatic side view showing the pedal, platform, and the operator's foot and the downward direction of action.

FIG. 4 is a diagrammatic top plan view of a three-wheel vehicle showing the forward traction created by the action indicated in FIG. 3.

FIG. 5 is a side diagrammatic view of the operator's foot showing a platform and the pedal and the direction of upward movement.

FIG. 6 is the diagrammatic top plan view of the vehicle showing its reverse traction direction in accord with FIG. 5.

FIG. 7 is the diagrammatic view showing the downward pressure on the pedal.

FIG. 8 is a diagrammatic view of a reel type lawn mower which would be mounted on the vehicle of FIGS. 1 and 2, and showing the lowering of the mower by virtue of the downward action shown in FIG. 7.

FIG. 9 is a diagrammatic view showing the upward action on the pedal.

FIG. 10 is a diagrammatic view of the lawn mower showing the lift of the lawn mower in accord with the action of FIG. 9.

FIG. 12 is a rear exploded view of parts of the pedal assembly of this invention and of the vehicle on which the assembly is mounted, with some parts shown in solid lines, some in dot-dash lines, and with one portion duplicated and showing parts added thereto and being in brackets.

DETAILED DESCRIPTION OF THE PREFERRED EMBODIMENT

This invention has particular application to a gang type of lawn mower of the well-known structure, except of course for the invention portion as described herein. That is, the vehicle can be a three-wheel type vehicle, and it is the type where reel type lawn mowers are mounted on the vehicle and can be raised and lowered by the controls of this invention. Thus, the vehicle is a riding type lawn mower, and the operator can utilize both feet for performing four control functions with his two feet.

Figure 1:
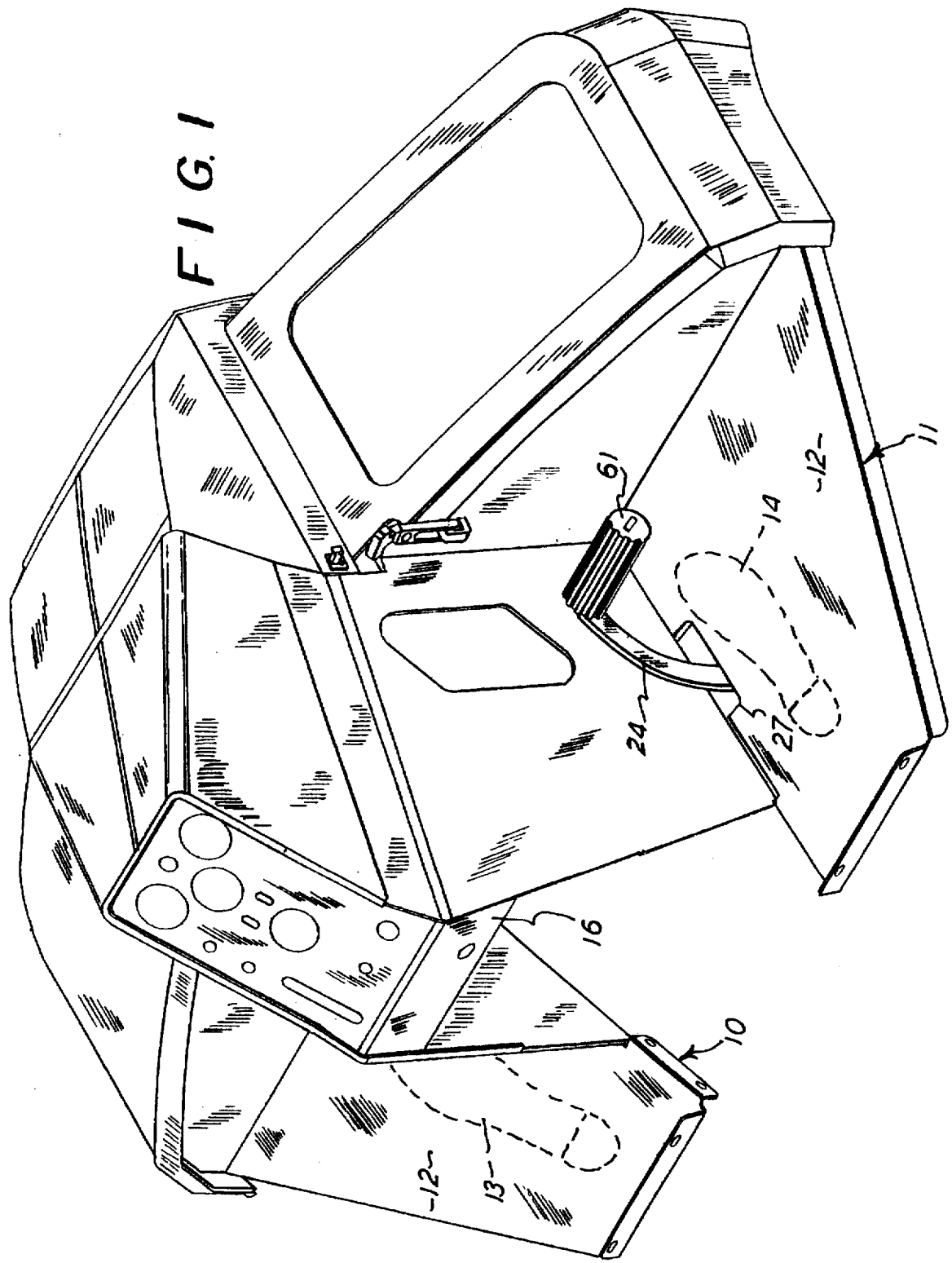
FIG. 1 is a rear perspective view of a fragment of a vehicle showing the pedal of this invention.

FIGS. 1 and 2 show a portion of a riding lawn mower, and this may be a standard type of riding mower, such as that shown in the aforementioned patents. The showings in FIGS. 1 and 2 are of the vehicle portions adjacent the location of the operator who is seated on the mower. A left footrest 10 and a right footrest 11 are shown to be of a planar arrangement having a flat upper surface 12 which extends for a distance substantially beyond the area of the operator's foot or shoe which is dotted in and shown as left and right shoes 13 and 14, respectively. That is, the operator can comfortably rest his feet on the planar surfaces 12 while operating the vehicle, and the surfaces 12 are of sufficient size that the operator can move his feet in various positions on the surfaces 12, for operator comfort and the operator is not restricted to one limited position for each of his feet. Also, the operator need not maintain his foot on any control, such as a foot pedal, but instead the operator simply straddles a center console 16, and the vehicle steering wheel 17 is available to the operator in that heretofore described operator-seated position.

The left and right sides of the vehicle have pivotally mounted pedals 18 and 19, respectively, and these pedals are shown disposed adjacent the foot platforms 10 and 11, but spaced thereabove. The pedals have cantilever and horizontally extending portions 21 and 22, respectively, and they also have arms 23 and 24 extending substantially vertically and to locations below the respective platforms 10 and 11 and thus they extend through openings 26 and 27 in the platforms 10 and 11, and thus are offset from the platforms The pedals 18 and 19 are thus parts of pedal assemblies which are more fully shown in FIGS. 11 and 12. Thus, the members 23 and 24 are pivot arms respectively pivotally mounted on pins 28 and 29, as shown respectively in FIGS. 11 and 12. Those two drawings show the greatest detail of the components, and it will thus be seen that the respective pedal assemblies articularly connect respectively to a traction drive assembly and a lawn mower lift assembly and mechanism. Thus the pins 28 and 29 are fixedly mounted on the vehicle and serve as the pivot axis for the pedal assemblies.

The lower end 31 of the arm 24 particularly connects to a fitting 32 which in turn connects to a pivotally mounted plate 33 through a connecting link 34, as shown. Thus the arm 24 is connected to the plate 33 by means of the pivot screw 36 extending through a screwhole 37 in the plate 33. In turn, the plate 33 is articularly connected to a hydraulic pump 38 suitably mounted on the vehicle, and it will be understood by one skilled in the art that the pump 38 is suitably supplied with hydraulic fluid which is used by hydraulic traction transmission means and thus the vehicle is under traction drive control by virtue of the pedal assembly 19. In accomplishing this vehicle arrangement, a portion of the vehicle frame 39 is shown in dot-dash lines, and the parts heretofore mentioned are therefore supported on the frame 39 in suitable manners.

That is, it will be seen that the pedal assembly pin 29 is pivotally mounted in a horizontally extending sleeve 41 affixed on the vehicle frame 39. Also, a U-shaped bracket 42 is shown affixed to the upstanding support 43 of the frame 39, and the pedal assembly arm 24 extends within the confines of the legs 44 of the U-shape 42. Thus, the arm 24 is limited in its pivotal motion by virtue of the position of the legs 44 which are in the path of the movement of the arm 24 when the arm 24 is pivoted about its pivot axis defined by pin 29. Further, an adjustment screw 46 is secured to the upper leg 44 by means of adjustment nuts 47, and thus the downwardly extending head of the screw 46 serves as an abutment for the arm 24 approximately at its rear edge designated 48, and thus the upward pivotal movement of the arm 24 is limited according to the adjusted position of the adjustment screw 46. As such, the upward pivotal movement of the pedal 22, as just mentioned, serves for actuation of reverse traction drive of the vehicle, and thus the reverse drive is desirably limited by virtue of the limit of the pivot action of the arm 24, as described and shown, and as mentioned leter.

That is, pivot action of the pedal assembly 19 will induce similar pivot action to the plate 33 about its pivot axis designated 49, and that pivot motion of the plate 33 is transferred into the unit 38 for controlling the forward and reverse traction drive to the vehicle. Of course the hydraulic unit 38 is suitably mechanically connected to the traction wheels (unshown) of the vehicle in any well-known manner. Thus, through manipulation of the pedal assembly 19, either downwardly or upwardly by the operator's foot, will cause the vehicle to move forward or backward.

Figure 11:
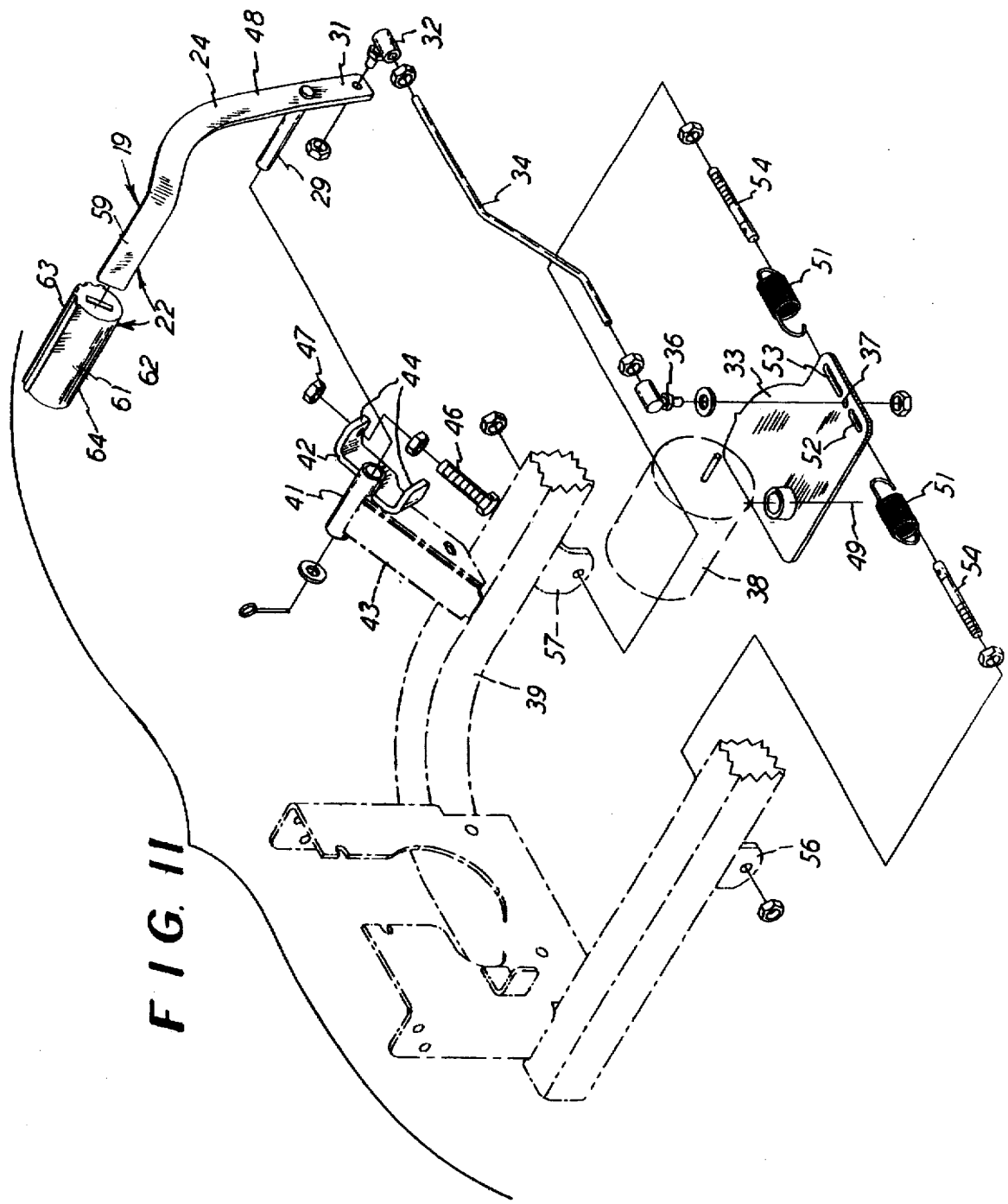
FIG. 11 is a front exploded view of certain parts of the pedal assembly of this invention and showing a portion of the vehicle.

FIG. 11 also shows that there are centering tension springs 51 which respectively connect into slots 52 and 53 in the arm 33 to pull thereon in opposite directions, and adjusting screws 54 connect with the respective springs and are fixedly mounted on respective ears 56 and 57 of the frame 39. Thus, when the operator's foot is not exerting any pressure on the pedal assembly 19, the springs 51 are arranged and adjusted to exert tension on the plate 33 to place it in a centered or neutral position so that there is neither forward nor reverse drive to the vehicle.

At this time it will also be noted that the pedals 21 and 22 include a portion 58 and 59, respectively, extending in that cantilever arrangement, and on which there is an elastomer cylindrical member 61 slid thereover by virtue of an elongated slot 62 in the member 61. Further, the upper surface of the member 61 has ribs and grooves at 63, and the lower surface 64 which is semi-circular and throughout the length of the member 61 is smooth. Therefore, the operator has a tread surface 63 on which he can press downwardly with the sole of his shoe, and he has a smooth surface 64 which he can press upwardly on by the top toe portion of his shoe. In that arrangement, he has good traction for downward pressure and he also does not scuff the shoe or pressure his toes when he is lifting upwardly on the pedal assemblies.

At this time it will be further noted and mentioned that when the operator presses downwardly on the pedal 22, for instance, then the vehicle is placed in a forward traction drive. When it is decided to go into reverse, the operator must remove the sole of his shoe from both the pedal member 61 and place it therebelow, and this takes a moment of time so that he cannot immediately direct the drive mechanism into a reverse mode from its previous forward mode. Accordingly, there is no strain on the vehicle and there are no undesirable spikes in the hydraulic pressures. That is, it is desirable to require that the operator reposition his foot relative to the pedal member 61 in order to alternate between the two drive directions of the vehicle.

Also, FIG. 3 shows the operator's foot 14, by virtue of arrow 66, pressing downwardly on the pedal assembly 19. At that time, it will also be seen that the operator's heel 67 is resting on the platform 11, and thus the operator has sensitive control of the pivot action of his foot about the heel 67 and it is also a restful position for the operator. In that downward action, FIG. 4 shows that the three-wheeled vehicle 67 moves forwardly in the direction of the arrow 68 when the foot is as described in FIG. 3.

Conversely, when the operator's foot 14 is as shown in FIG. 5, then toes 69 of the operator's foot is underneath the assembly 19 while the operator's heel 67 still rests on the platform 11. This induces the pivotal action for the assembly 19 in the direction of the arrow 71, and FIG. 6 shows that the three-wheel vehicle will then move in the reverse direction, as shown by the arrow 72.

The operator's left foot is shown in FIG. 7 to depress the pedal 21, in the direction of the arrow thereabove, and, again, it is accomplished while the director's heel remains on the platform 10. That is, the space between the two pedals and the respective platforms 10 and 11 is such that the pedals are within the length of the operator's foot, and this permits the operator to have sensitive control of his foot and thus sensitive control of the respective pedals. FIG. 8 then shows that depressing pedal 21 causes the mowers 84 to be lowered in the direction of the downwardly directed arrow 86.

Finally, FIG. 9 shows the operator's foot 13 underneath the pedal 21 and actuating the pedal in the direction of the upwardly directed arrow above the pedal 21. FIG. 10 then shows that the mowers 84 are being raised, such as shown by the upwardly directed arrow in FIG. 10.

Next, the mechanism for the raising and lowering of mowers mounted on the vehicle is also shown in these drawings, and the details thereof are particularly shown in FIG. 12. Here the vehicle frame 39 is shown to present a pivot sleeve 73 which receives the pedal assembly pin 28. A right angled bracket 74 is affixed to the frame upstanding arm 76 and is in the path of movement of the pedal assembly upright arm 23 to thus limit the pivotal movement of the pedal assembly arm 23 in that direction. Adjusting screws 77 are shown mountable on the bracket 74 for adjusting the limit of the pivotal movement of the arm 23 toward the projecting portion of the bracket 74. That direction of pedal assembly motion would be for the action of lifting mowers which are articularly mounted on the vehicle for raising and lowering in the customary arrangement with riding lawn mowers. Also, the lift and lowering mechanism includes a hydraulic apparatus such as with 78 and 82.

Also, the adjustable stops 77 are available so that the stroking of the valve 78 precludes the customary valve spool from hitting its end stops within the valve itself.

A pin 79 is affixed to the lower end of the arm 23, and a link 81 is connected to the hydraulic spool within the valve 78 for control of the latter upon pivotal action of the arm 23. Also, hydraulic connections are shown, and it will be understood and seen that these connections extend to a hydraulic cylinder 82 controlled by the valve 78 which is under the influence of the arm 23. Thus, the cylinder 82 can extend and retract under controlled hydraulic pressure, and it is connected, such as through an upstanding mounting pin 83.

Again, the pedal assembly 21 is arranged similar to that of the assembly 22, except in mirror image thereof, and the assembly 21 has its horizontally extending arm 28 over which the elastomer cover 87 is applied, and this cover 45 has its tread or ridges 88 on top and its smooth semi-circular section 89 on the bottom, for the purposes heretofore mentioned in connection with pedal 19.

With these two pedal assemblies 21 and 22 and their upstanding and cantilever configurations, the operator has full access to the footrests 10 and 11 because the pedals are not at all obstructing that access, and thus the operator has maximum comfort and unrestricted foot positions.

The traction drive mechanism consists of standard mechanism familiar to anyone skilled in the art, and it may be as shown in U.S. Pat. No. 3,722,314, and it is all of the mechanism which exists in its control train beyond the arm 33. Likewise, the implement lift and lowering mechanism may be that which is known to anyone skilled in the art, and it is of course at least partly shown in FIGS. 8, 10, and 12. It is that mechanism which exists in the control train beyond the pedal pin 79. Also, in FIG. 12, the adjustable screw stops 77 are shown relative to a second showing of the singular plate 74, and such showing is presented with brackets therearound for purposes of greater detail as presented. With regard to the adjustable stops 46 and 77, they are presented for purposes of limiting the hydrostatic stroking with regard to avoiding hitting the internal stops in the hydrostatic apparatus, such as mentioned in connection with the pump valve 78. Also, the unit 38 in FIG. 11 can comprise a hydrostatic transmission of the conventional arrangement and construction which is under the control of the pivoted position of the plate or arm 33, as mentioned.

What is claimed is:

1. A vehicle and a control pedal system comprising a vehicle, a first horizontally extending operator's footrest platform on said vehicle and being of a length and width sufficient to present an upward projection greater than that of an operator's shoe for full upward support of an operator's foot, a power means on said vehicle for forward and reverse traction drive of said vehicle, a first foot controllable pedal movably mounted on said vehicle in a position spaced directly above said platform and being movable for up and down movement and having only a single cantilever-mounted and horizontally extending portion disposed clear of any obstruction immediately above and below said portion so as to be disposed within the length of an operator's foot and so as to be contacted by an operator's foot both above and below said portion so that said portion can be actuated to be both lowered and lifted by an operator's foot, and with said power means being arranged for respective forward and reverse traction drive relative to respective lowering and lifting of said pedal, and connection means interconnected between said power means and said pedal for transmitting the lowering and lifting action of said pedal onto said power means to achieve vehicle traction drive.

2. The vehicle and control pedal system as claimed in claim 1, including a second footrest platform on said vehicle, a second foot controllable pedal movably mounted on said vehicle in a position spaced directly above said second platform and being mowable up and down, and with said second pedal having only a single cantilever-mounted and horizontally extending portion disposed clear of any obstruction immediately above and below said portion thereof so as to be disposed within the length of an operator's foot and so as to be contacted by an operator's foot both above and below said portion so that said portion can be actuated to be both lowered and lifted by an operator's foot, lawn mowers mounted on said vehicle, and raising and lowering means operatively connected with said mowers and said second pedal for raising and lowering said mowers upon transmitting the respective up and down movement of said second pedal to said raising and lowering means.

3. The vehicle and control pedal system as claimed in claim 2, wherein said first and second pedals are positioned in spaced-apart locations on said vehicle in respective right foot and left foot positions relative to an operator's right foot and left foot so that said two pedals are actuatable by an operator's feet, said second horizontally extending operator's footrest platform on the vehicle being of a length and width sufficient to present an upward projection greater than that of an operator's shoe for full upward support of an operator's foot, and said second platform spaced below said second pedal.

4. The vehicle and control pedal system as claimed in claim 3 wherein both said pedals and said power means and said traction drive all being arranged for both independent and simultaneous operation when desired.

5. The vehicle and control pedal system as claimed in claim 2 wherein said first pedal and said second pedal are disposed on said vehicle for respective actuation exclusively by an operator's right foot and left foot when an operator is facing the forward direction of movement of said vehicle.

6. The vehicle and control pedal system as claimed in claim 1, including a pedal movement stop operatively associated with said first pedal and in position to limit upward movement of said first pedal when said first pedal is lifted.

7. In a riding lawn mowing vehicle having a traction drive assembly and lawn mowers and lift mechanism for raising and lowering said lawn mowers and having footrest platforms for an operator's feet, the improvement comprising a first and a second movably mounted pedal assembly operatively connected respectively to said traction drive assembly and said lift mechanism, each of said pedal assemblies including a pedal extending in cantilever arrangement spaced above said footrest platforms with room for an operator's feet below said pedals, said first pedal with its respective assembly being operatively connected to said traction drive assembly for forward traction drive action in response to depressing said first pedal by an operator's foot and for reverse traction drive in response to lifting of said first pedal by an operator's foot, and said second pedal assembly being operatively connected to said lift mechanism for raising said mowers in response to lifting of said second pedal by an operator's foot and for lowering said mowers in response to depressing said pedal by an operator's foot.

8. The riding lawn mowing vehicle as claimed in claim 7 including a pedal movement stop operatively associated with said first pedal and being in position to limit upward movement of said first pedal when said first pedal is lifted.

9. The riding lawn mowing vehicle as claimed in claim 7, wherein said platforms each present one upright projected area, said pedal assemblies each include an upstanding pivotally mounted arm extending past and clear of the respective said footrest platforms for pivotal movement therepast, and both said arms having upper ends being cantilever disposed to extend within said upright projected area of said respective said platforms.

10. The riding lawn mowing vehicle as claimed in claim 7, wherein both said traction drive assembly and said lift mechanism each constitute a hydraulically powered apparatus, and including adjustable stops mounted on the mowing vehicle adjacent each of said pedal assemblies for limiting the movement of each of said pedal assemblies and thereby restrict the two said pedal assemblies from reaching their end limits in their functions.

11. In a vehicle control pedal assembly and a conventional power means for a vehicle, the improvement comprising a vehicle, a power means on said vehicle, a pedal movably mounted on said vehicle for upward movement and downward movement, connecting means interconnected between said pedal and said power means for controlling said power means in response to up and down motion of said pedal, said pedal being cylindrically shaped and disposed on a horizontal axis and having an upwardly facing semi-circular half and a downwardly facing semi-circular half, a tread of an irregular surface on said upwardly facing half for supporting the sole of the shoe of an operator for the downward movement of said pedal, a smooth surface on said downwardly facing half for engaging the top of the toes of an operator's foot for the upward movement of said pedal, and a platform disposed directly beneath said pedal and being spaced therebelow within the length of an operator's foot and thereby serve as a footrest while an operator's foot is in contact with said pedal.

12. A vehicle control pedal system comprising a vehicle, a horizontally extending operator's footrest platform on said vehicle and being of a length and width sufficient to present an upward projection greater than that of an operator's shoe for full upward support of an operator's foot, a power means on said vehicle for forward and reverse traction drive of said vehicle, a foot controllable pedal movably mounted on said vehicle in a position spaced directly above said platform and being movable for up and down movement and having only a single cantilever-mounted and horizontally extending portion disposed clear of any obstruction immediately above and below said portion so as to be disposed within the length of an operator's foot and so as to be contacted by a vehicle operator's foot both above and below said portion so that said portion can be actuated to be both lowered and lifted by an operator's foot, and with said power means being arranged for respective forward and reverse traction drive relative to respective lowering and lifting of said pedal, connection means interconnected between said power means and said pedal for transmitting the up and down movement of said pedal onto said power means so as to achieve vehicle traction drive, and spring-biasing means operatively connected with said connection means for effecting a neutral traction drive position in the absence of pedal foot pressure from an operator.

13. The vehicle control pedal system as claimed in claim 12, including adjustment means operatively connected with said spring-biasing means for adjusting said spring biasing means to establish said neutral traction drive position.

* * * * *

UNITED STATES PATENT AND TRADEMARK OFFICE
CERTIFICATE OF CORRECTION

PATENT NO. : 5,695,023
DATED : Dec. 9, 1997
INVENTOR(S) : Randal S. Knurr
Lynn G. Westbrook It is certified that error appears in the above-identified patent and that said Letters Patent is hereby corrected as shown below:

In Claim 2, column 6, line 40 "mowable" should read --movable--.

In Claim 3, column 6, line 64, "horizontally extending operator's" should be canceled.

Signed and Sealed this

Tenth Day of February, 1998

Attest:

BRUCE LEHMAN

Attesting Officer

Commissioner of Patents and Trademarks